(12) United States Patent
Singh et al.

(10) Patent No.: US 11,807,186 B1
(45) Date of Patent: Nov. 7, 2023

(54) ACTIVE GRILLE SHUTTERS FOR VEHICLES INCLUDING INTEGRATED PEDESTRIAN GUARDS

(71) Applicant: Nissan North America, Inc., Franklin, TN (US)

(72) Inventors: Jasvir Singh, Novi, MI (US); Spencer Boyd, III, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/885,182

(22) Filed: Aug. 10, 2022

(51) Int. Cl.
*B60R 21/34* (2011.01)
*B60K 11/08* (2006.01)

(52) U.S. Cl.
CPC ............ *B60R 21/34* (2013.01); *B60K 11/085* (2013.01)

(58) Field of Classification Search
CPC ......... B60R 19/52; B60R 19/18; B60R 21/34; B60R 2019/525; B60R 19/02; B60R 2019/186; B60K 11/085; B60K 11/08
USPC ........................................................ 180/271
See application file for complete search history.

(56) References Cited

U.S. PATENT DOCUMENTS

| | | | | |
|---|---|---|---|---|
| 8,646,552 B2* | 2/2014 | Evans | ...................... | B60R 19/12 180/68.1 |
| 8,931,824 B2* | 1/2015 | Lopez | ...................... | B60R 21/34 296/187.04 |
| 9,475,441 B2* | 10/2016 | Calleja | ...................... | B60R 19/52 |
| 10,737,568 B2* | 8/2020 | Shinohara | ............... | B60R 21/34 |
| 2012/0019027 A1* | 1/2012 | Tashiro | .................... | B60R 19/02 296/193.09 |
| 2013/0223980 A1* | 8/2013 | Pastrick | ............... | B60K 11/085 415/1 |
| 2014/0175815 A1* | 6/2014 | Kim | ........................ | B60R 19/52 293/115 |
| 2015/0001863 A1* | 1/2015 | Cha | ......................... | B29C 70/42 293/120 |
| 2018/0208049 A1* | 7/2018 | Klop | ....................... | B60R 19/52 |
| 2022/0363216 A1* | 11/2022 | Akif | ........................ | B60R 19/02 |

FOREIGN PATENT DOCUMENTS

| | | | |
|---|---|---|---|
| JP | 2006347392 A | * 12/2006 | |
| JP | 2007320530 A | * 12/2007 | |
| JP | 4487863 B2 | * 6/2010 | |
| JP | 2020001503 A | * 1/2020 | |
| JP | 2020011689 A | * 1/2020 | ............. B60R 19/52 |

OTHER PUBLICATIONS

JP 2007320530 A , Sotaro, FIled Jun. 5, 2006 English Translation and Original Document retrieved Feb. 23, 2023 (Year: 2006).*

* cited by examiner

*Primary Examiner* — Paul N Dickson
*Assistant Examiner* — Caitlin Anne Miller
(74) *Attorney, Agent, or Firm* — Young Basile Hanlon & MacFarlane, P.C.

(57) ABSTRACT

A vehicle includes: a vehicle body; a support structure that is connected to the vehicle body and which is configured to provide a framework for one or more thermal components of the vehicle; a reinforcement member that is connected to the vehicle body and which is configured to absorb impact forces; and an active grille shutter that is connected to the support structure. The active grille shutter includes an integral pedestrian guard that is configured for contact with a pedestrian's leg to protect the pedestrian's leg during an impact.

17 Claims, 3 Drawing Sheets

ACTIVE GRILLE SHUTTERS FOR VEHICLES INCLUDING INTEGRATED PEDESTRIAN GUARDS

TECHNICAL FIELD

The present disclosure relates to an airflow regulation assembly for a vehicle including an active grille shutter. More specifically, the present disclosure describes an airflow regulation assembly in which the active grille shutter includes an integrated (e.g., integral) pedestrian guard.

BACKGROUND

Many vehicles include an airflow regulation assembly with an active grille shutter to improve fuel economy by providing a mechanism for controlling the volume of air flowing into the radiator (and/or other areas of the engine compartment) according to the particular airflow requirements of the vehicle during various driving conditions. Operation of the airflow regulation assembly (e.g., the active grille shutter) is dictated by a number of factors including, for example, engine cooling and thermal specifications, which also influence (e.g., determine) the size of the shutters and the sequence at which they open and close.

To improve safety, many vehicles also include a pedestrian guard, which is also common referred to as an "apron bracket," a "leg-catcher (deflector)," or a "calf-catcher (deflector)", to protect a pedestrian's leg(s). In such vehicles, the pedestrian guard is located behind the (front end) fascia and is configured to displace the lower portion of the pedestrian's leg(s) to protect the pedestrian's knees in the event of an impact.

Typically, active grille shutters and pedestrian guards are provided as separate, discrete components of a vehicle that are devoid of any direct connection therebetween and which are formed from different materials of construction, giving rise to certain manufacturing and installation complexities (e.g., parts variation between vehicles, increased tolerances and form factors, etc.). As such, an opportunity exists to improve packaging by reducing the number of components in the vehicle and the overall form factor of the airflow regulation assembly. The present disclosure addresses this opportunity by providing an airflow regulation assembly in which the pedestrian guard is integrated into the active grille shutter in an integral (e.g., unitary, monolithic) manner.

SUMMARY

In one aspect of the present disclosure, a vehicle is disclosed that includes: a vehicle body; a support structure that is connected to the vehicle body and which is configured to provide a framework for one or more thermal components of the vehicle; a reinforcement member that is connected to the vehicle body and which is configured to absorb impact forces; an active grille shutter that is connected to the support structure; and a pedestrian guard that is directly connected to the active grille shutter and which is configured for contact with a pedestrian's leg to protect the pedestrian's leg during an impact. The active grille shutter includes: a main body; at least one shutter that is movably connected to the main body; and an actuator that is operably connected to the at least one shutter to facilitate opening and closure thereof to vary airflow into the vehicle.

In certain embodiments, the pedestrian guard may be formed integrally with the main body.

In certain embodiments, the main body and the pedestrian guard may be rigid in construction.

In certain embodiments, the main body and the pedestrian guard may be non-metallic in construction.

In certain embodiments, the active grille shutter may be positioned vertically below the reinforcement member.

In certain embodiments, the reinforcement member may extend axially forward of the active grille shutter along the length of the vehicle.

In certain embodiments, the pedestrian guard may extend axially forward of the main body along the length of the vehicle.

In certain embodiments, the pedestrian guard may extend axially forward of the reinforcement member along the length of the vehicle.

In certain embodiments, the vehicle may further include a front end fascia that is positioned axially forward of the vehicle body, the support structure, the reinforcement member, and the active grille shutter along the length of the vehicle.

In certain embodiments, the pedestrian guard may include a front end that is positioned within a pocket defined by a lower end of the front end fascia.

In another aspect of the present disclosure, a vehicle is disclosed that includes: a vehicle body; a support structure that is connected to the vehicle body and which is configured to provide a framework for one or more thermal components of the vehicle; a reinforcement member that is connected to the vehicle body and which is configured to absorb impact forces; and an active grille shutter that is connected to the support structure. The active grille shutter includes an integral pedestrian guard that is configured for contact with a pedestrian's leg to protect the pedestrian's leg during an impact.

In certain embodiments, the active grille shutter may include a main body that movably supports at least one shutter to thereby vary airflow into the vehicle.

In certain embodiments, the main body and the integral pedestrian guard may be formed from a single piece of rigid material.

In certain embodiments, the integral pedestrian guard may extend axially forward of the reinforcement member along the length of the vehicle.

In certain embodiments, the vehicle may further include a front end fascia that is positioned axially forward of the vehicle body, the support structure, the reinforcement member, and the active grille shutter along the length of the vehicle.

In certain embodiments, the integral pedestrian guard may include a front end that is positioned within a pocket defined by a lower end of the front end fascia.

In another aspect of the present disclosure, a method of assembling a vehicle is disclosed that includes: connecting a support structure to a body of the vehicle such that the support structure provides a framework for one or more thermal components of the vehicle; connecting a reinforcement member to the body of the vehicle such that the reinforcement member is positioned to absorb impact forces; and connecting an active grille shutter to the support structure such that a pedestrian guard formed integrally with the active grille shutter extends axially forward of the reinforcement member along the length of the vehicle.

In certain embodiments, connecting the active grille shutter to the support structure may include positioning the active grille shutter vertically below the reinforcement member.

In certain embodiments, the method may further include connecting a front end fascia to the vehicle such that the front end fascia is positioned axially forward of the body, the support structure, the reinforcement member, and the active grille shutter along the length of the vehicle.

In certain embodiments, connecting the front end fascia to the vehicle may include concealing the pedestrian guard within the front end fascia.

In certain embodiments, concealing the pedestrian guard within the front end fascia may include positioning a front end of the pedestrian guard within a pocket defined by a lower end of the front end fascia.

BRIEF DESCRIPTION OF THE DRAWINGS

According to common practice, the various features of the drawings may not be to scale and may be arbitrarily expanded or reduced for clarity.

DETAILED DESCRIPTION

Figure 1:
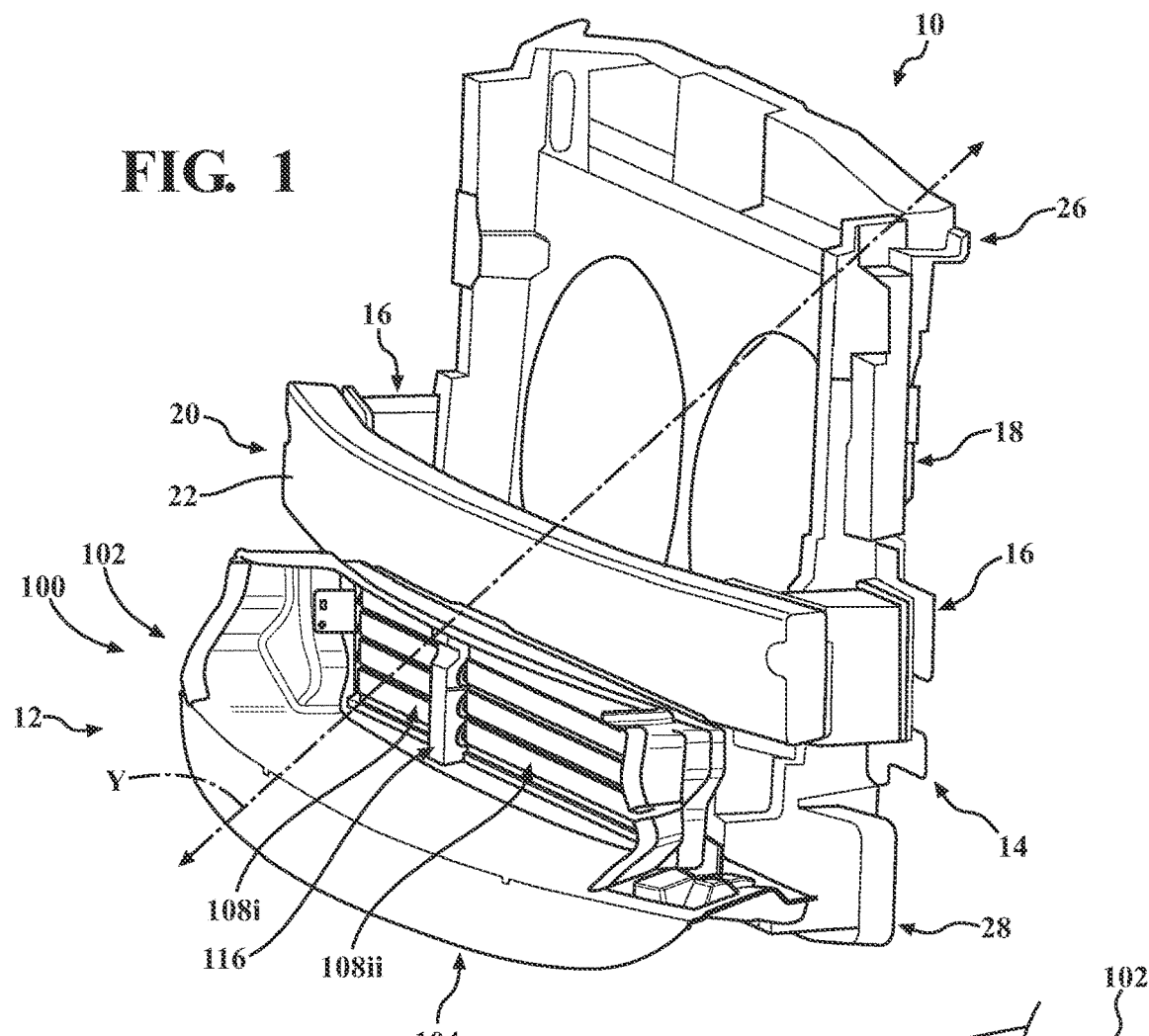
FIG. 1 is a partial, front, perspective view of a front end of a vehicle including an airflow regulation assembly having an active grille shutter with an integrated pedestrian guard according to the principles of the present disclosure.
Figure 2:
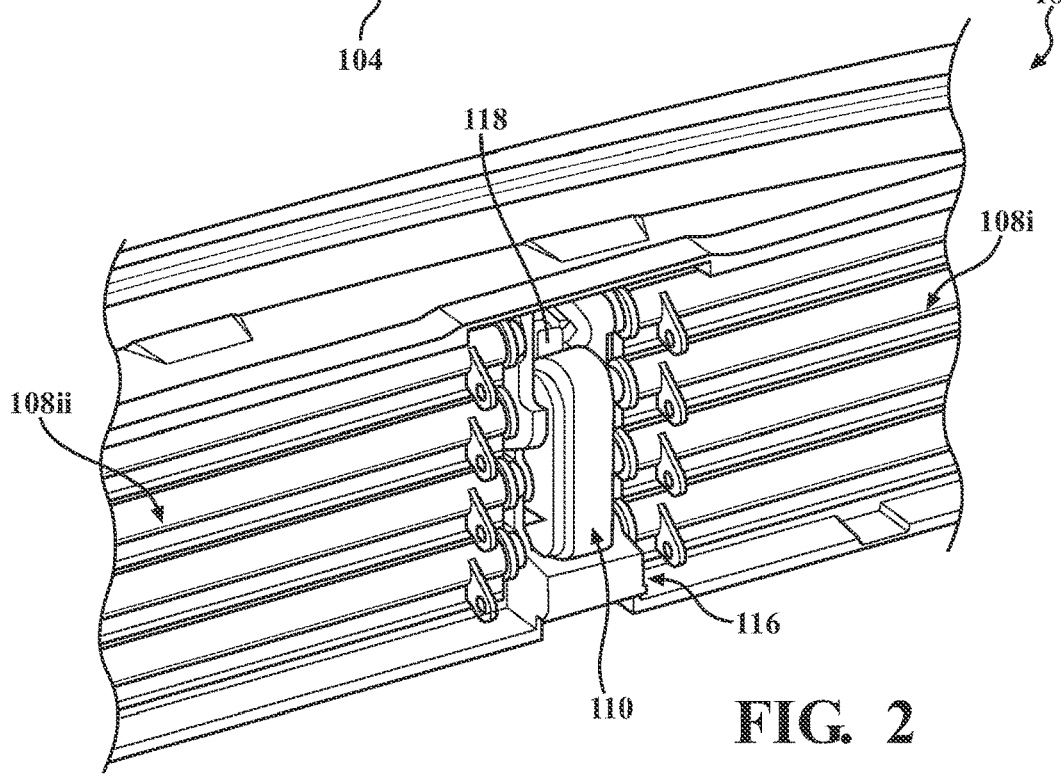
FIG. 2 is a partial, rear, perspective view of the active grille shutter seen in FIG. 1.

The present disclosure describes a vehicle that includes an airflow regulation assembly having an active grille shutter with an integrated pedestrian guard that is configured for contact with a pedestrian's leg to protect the pedestrian's leg during an impact. In contrast to known vehicles including both an active grille shutter and a pedestrian guard, the pedestrian guard described herein is directly connected to (e.g., is formed integrally with) the active grille shutter, which alleviates certain manufacturing complexities and allows for an overall reduction in the form factor of the airflow regulation assembly.

With reference to FIGS. 1-4, a vehicle 10 is illustrated with a front end 12 that includes: a vehicle body (chassis) 14 with lateral supports 16; a (radiator core) support structure 18; a (front end) reinforcement member 20 (e.g., a crash beam 22); a front end fascia 24 (FIG. 4); and an airflow regulation assembly 100 including an active grille shutter 102 and a pedestrian guard 104. Although generally illustrated and described in the context of a passenger vehicle, it should be appreciated that the principles of the present disclosure are equally applicable to a variety of vehicles (e.g., trucks, SUVs, vans, buses, etc.). Additionally, while the airflow regulation assembly 100 is illustrated and described as being located in the front end 12 of the vehicle 10, it should be appreciated that the principles of the present disclosure may find applicability to the rear end of the vehicle 10 as well.

The support structure 18 is a structural component of the vehicle 10 that not only adds rigidity and strength, but supports and provides a framework for one or more of the thermal components of the vehicle 10 (e.g., the radiator, the condenser, etc.). The support structure 18 includes respective upper and lower ends 26, 28 and is connected to the vehicle body 14 (e.g., the lateral supports 16) such that the support structure 18 is located axially inward of (e.g., is spaced rearwardly from) the reinforcement member 20 and the front end fascia 24 along a longitudinal axis Y (which extends in (generally) parallel relation to the length of the vehicle 10). It is envisioned that the support structure 18 may be removably or fixedly (e.g., non-removably) connected to the vehicle body 14 in any suitable manner, including, for example, via at least one mechanical fastener (e.g., one or more bolts, screws, rivets, pins, clips, or the like), via welding, via integral (e.g., unitary, monolithic) formation therewith, etc.

The reinforcement member 20 protects and fortifies the front end 12 of the vehicle 10 and is positioned axially between the front end fascia 24 and the support structure 18 along the longitudinal axis Y such that the reinforcement member 20 extends axially forward of the active grille shutter 102. The reinforcement member 20 is connected to (supported by) the vehicle body 14 (e.g., the lateral supports 16) and acts as a bumper that absorbs force during an impact with the vehicle 10 (e.g., a crash, a collision, etc.). It is envisioned that the reinforcement member 20 may be removably or fixedly (e.g., non-removably) connected to the vehicle body 14 in any suitable manner, including, for example, via at least one mechanical fastener (e.g., one or more bolts, screws, rivets, pins, clips, or the like), via welding, via integral (e.g., unitary, monolithic) formation therewith, etc.

The front end fascia 14 is positioned (extends) axially forward of the vehicle body 14, the support structure 18, the reinforcement member 20, and the airflow regulation assembly 100 (e.g., the active grille shutter 102) along the longitudinal axis Y (and the length of the vehicle 10) and extends laterally (e.g., horizontally) across the front end 12 of the vehicle 10. The front end fascia 14 serves a multitude of functions including, for example, improving aerodynamics, creating a particular aesthetic appearance, and concealing (covering) various components of the vehicle 10, and includes a lower end 30 (FIG. 4) defining a pocket 32 (e.g., a recess, chamber, etc.) that is configured to receive (accommodate) the active grille shutter 102, as described in further detail below.

The airflow regulation assembly 100 is secured (connected to) the lower end 28 of the support structure 18, whereby the airflow regulation assembly 100 is positioned vertically below the reinforcement member 20. The active grille shutter 102 controls (regulates) airflow into the vehicle 10 and includes: a main body 106 (FIGS. 3, 4); at least one shutter 108 that is movably connected to the main body 106; and an actuator 110 that is connected to the main body 106 and the shutter(s) 108 to facilitate and control opening and closure thereof to thereby vary airflow into the vehicle 10.

The main body 106 includes respective front and rear ends 112, 114 and supports (e.g., provides a housing for) the shutter(s) 108 and the actuator 110. In the particular embodiment illustrated, the main body 106 is (mechanically) connected to (supported by) the support structure 18. Depending upon the particular style of the vehicle 10, the configuration of the support structure 18, the configuration of the reinforcement member 20, etc., however, embodiments are also envisioned in which the main body 106 may instead be connected to (supported by) the reinforcement member 20.

Figure 3:
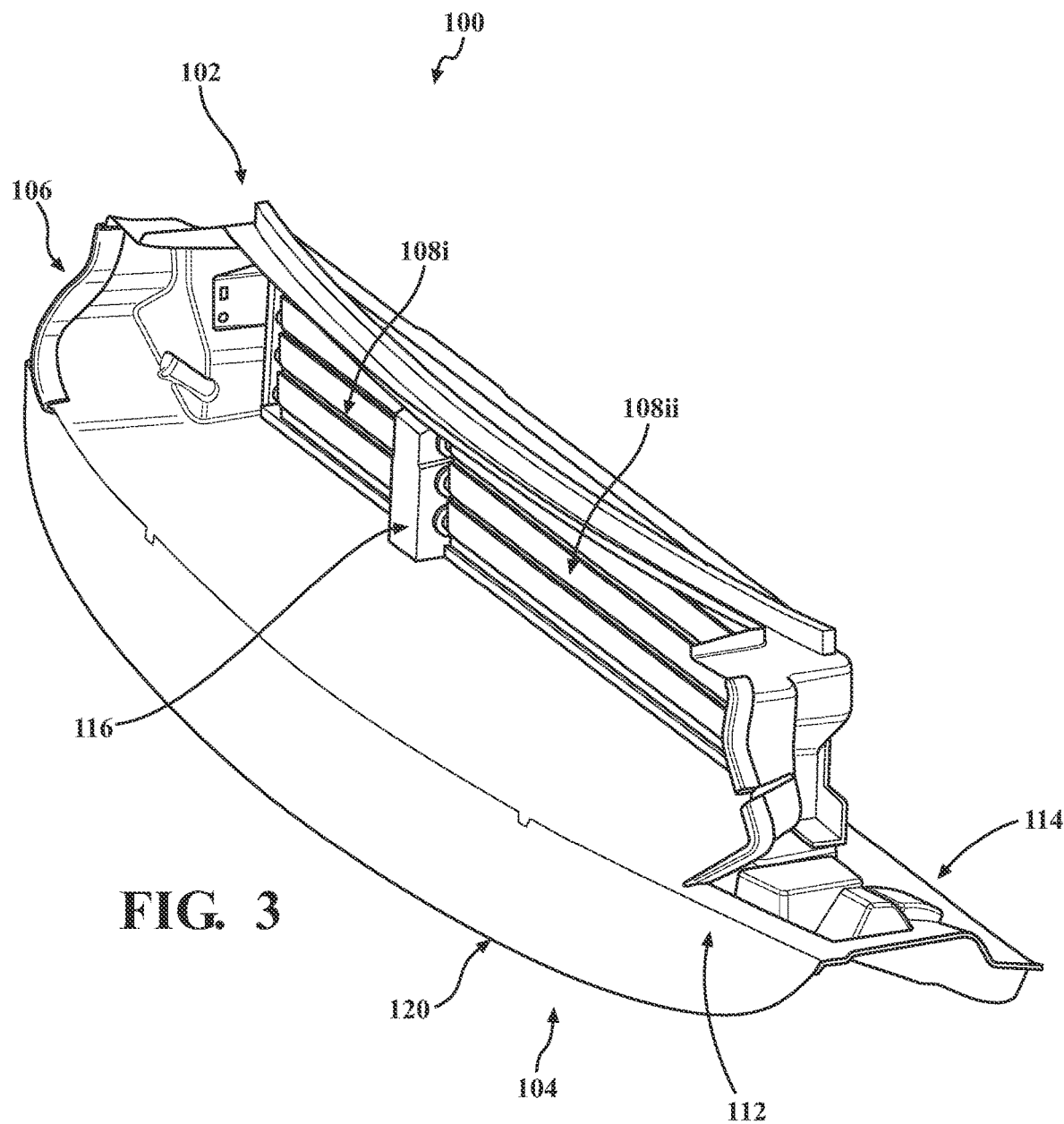
FIG. 3 is a front, perspective view of the active grille shutter and the pedestrian guard seen in FIG. 1.

As seen in FIGS. 1 and 3, the active grille shutter 102 includes (first and second) shutters 108$i$, 108$ii$ that are separated (and supported) by an actuator support 116, which extends vertically therebetween and defines a chamber 118 (FIG. 2) that is configured to receive (accommodate, house, conceal) the actuator 110. It should be appreciated, however, that the particular number of shutters 108 may be altered in various embodiments without departing from the scope of the present disclosure (e.g., depending upon the airflow requirements of the vehicle 10). As such, embodiments of the airflow regulation assembly 100 including both greater and fewer numbers of shutters 108 are contemplated herein and would not be beyond the scope of the present disclosure.

Figure 4:
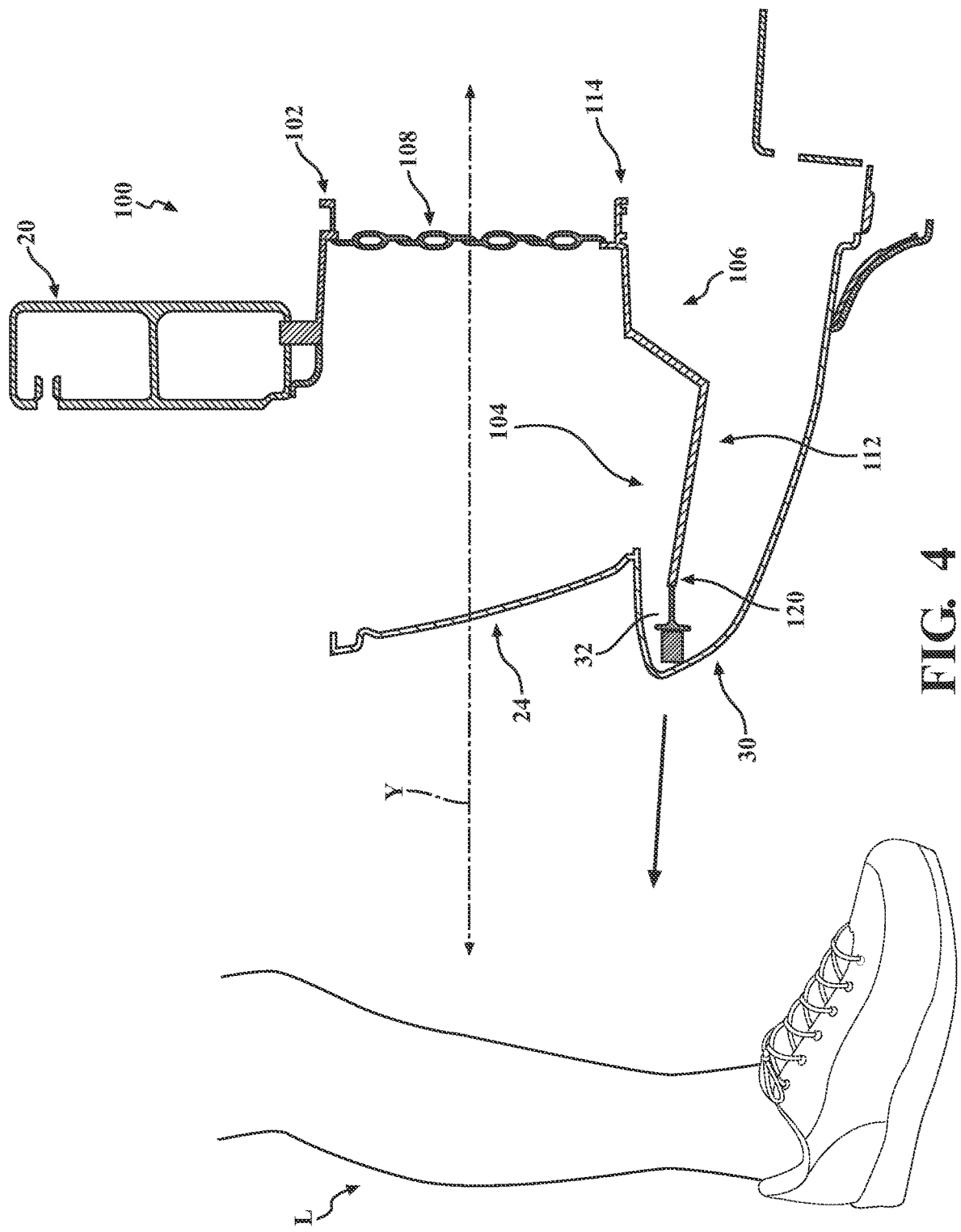
FIG. 4 is a partial, vertical, cross-sectional view of the front end of the vehicle seen in FIG. 1.

With particular reference to FIGS. 3 and 4, the pedestrian guard 104 will be discussed. The pedestrian guard 104 is directly connected to the active grille shutter 102 and is configured for contact with a pedestrian's leg L in the event of an impact. More specifically, the pedestrian guard 104 projects (extends) axially forward of the active grille shutter 102 (e.g., the front end 112 of the main body 106) and the reinforcement member 20 (FIG. 1) along the longitudinal axis Y (and the length of the vehicle 10), whereby, upon impact, the pedestrian guard 104 displaces the lower portion of the pedestrian's leg L in the direction of travel of the vehicle 10 and, thus, protects the pedestrian's knees.

In the particular embodiment illustrated, the pedestrian guard 104 is integrated into, and is formed integrally (e.g., unitarily, monolithically) with, the main body 106 of the active grille shutter 102. More specifically, the main body 106 and the pedestrian guard 104 are formed from a single piece of material, whereby the pedestrian guard 104 constitutes an integral component of the active grille shutter 102. Integration of the pedestrian guard 104 into the active grille shutter 102 allows for a reduction in the number of components in the vehicle 10 and, thus, tolerance stackup, as well as a reduction in the overall (vertical) form factor of the airflow regulation assembly 100, thereby improving the packaging in the front end 12 of the vehicle 10. Additionally, by integrating the pedestrian guard 104 into the active grille shutter 102, complexities that may otherwise result from parts variation between vehicles can be avoided (if not entirely eliminated).

While the main body 106 and the pedestrian guard 104 may be formed through any suitable method of manufacture, in the particular embodiment illustrated, the main body 106 and the pedestrian guard 104 are formed via injection molding. In contrast to known active grille shutters, which typically include both rigid and non-rigid materials of construction (e.g., a (first) hard-shot material with a first durometer and a (second) soft-shot material with a second, lower durometer), the main body 106 and the pedestrian guard 104 exclusively include one or more hard-shot materials, which results in a rigid, non-metallic construction. More specifically, the main body 106 and the pedestrian guard 104 are concomitantly formed using one or more hard-shot materials, which results in a generally uniform (consistent) overall durometer. Embodiments in which the main body 106 and the pedestrian guard 104 may include a (uniform) metallic construction (e.g., embodiments in which the main body 106 and the pedestrian guard 104 are formed from a single piece of metallic material) are also envisioned herein, however, and would not be beyond the scope of the present disclosure.

As seen in FIG. 4, the pedestrian guard 104 is received by (concealed, housed) within the front end fascia 24. More specifically, the pedestrian guard 104 includes a front end 120 that extends into the pocket 32 defined by the lower end 30 of the front end fascia 24. Configuring the pedestrian guard 104 for insertion into the pocket 32 during assembly of the vehicle 10 reduces the axial offset between the front end fascia 24 and the pedestrian guard 104 (along the longitudinal axis Y and the length of the vehicle 10) such that the front end fascia 24 and the pedestrian guard 104 collectively define, or are positioned in general alignment with, a front-most surface of the vehicle 10, which allows the pedestrian guard 104 to displace and protect the pedestrian's leg L in the event of an impact, as described above.

While the active grille shutter 102 (e.g., the main body 106) and the pedestrian guard 104 are generally shown and described as being integrally (e.g., unitarily, monolithically) formed throughout the present disclosure, embodiments are also envisioned, however, in which the active grille shutter 102 (e.g., the main body 106) and the pedestrian guard 104 may be formed as separate, discrete structures that may be removably or fixedly (e.g., non-removably) connected together in any suitable manner, including, for example, via at least one mechanical fastener (e.g., one or more bolts, screws, rivets, pins, clips, or the like), via welding, via an adhesive, etc. In such embodiments, it is envisioned that the main body 106 may include (e.g., may be formed from) a first material and that the pedestrian guard 104 may include (e.g., may be formed from) a second, different material. For example, in one particular embodiment, it is envisioned that the main body 106 may include (e.g., may be formed partially or entirely from) a non-metallic material, such as one or more plastics, one or more polymers, one or more composites (e.g., carbon fiber), etc., and that the pedestrian guard 104 may include (e.g., may be formed partially or entirely from) a metallic material, such as aluminum, stainless steel, titanium, etc.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (e.g., an angle that lies within the range of (approximately) 135° to (approximately)225°). The term "generally parallel" should thus be understood as referring to encompass configurations in which the pertinent components are arranged in parallel relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle comprising:
a vehicle body;
a support structure connected to the vehicle body and configured to provide a framework for one or more thermal components of the vehicle;
a reinforcement member connected to the vehicle body and configured to absorb impact forces;
an active grille shutter connected to the support structure, the active grille shutter including:
a main body;
at least one shutter movably connected to the main body; and
an actuator operably connected to the at least one shutter to facilitate opening and closure thereof to vary airflow into the vehicle; and
a pedestrian guard directly connected to the active grille shutter and configured for contact with a pedestrian's leg to protect the pedestrian's leg during an impact, wherein the pedestrian guard extends axially forward of the reinforcement member along a length of the vehicle, wherein the main body and the pedestrian guard are formed unitarily from a single piece of material.

2. The vehicle of claim 1, wherein the main body and the pedestrian guard are rigid in construction.

3. The vehicle of claim 2, wherein the main body and the pedestrian guard are non-metallic in construction.

4. The vehicle of claim 1, wherein the active grille shutter is positioned vertically below the reinforcement member.

5. The vehicle of claim 1, wherein the reinforcement member extends axially forward of the active grille shutter along the length of the vehicle.

6. The vehicle of claim 5, wherein the pedestrian guard extends axially forward of the main body along the length of the vehicle.

7. The vehicle of claim 1, further including a front end fascia positioned axially forward of: the vehicle body; the support structure; the reinforcement member; and the active grille shutter along a length of the vehicle.

8. The vehicle of claim 7, wherein the pedestrian guard includes a front end positioned within a pocket defined by a lower end of the front end fascia.

9. A vehicle comprising:
a vehicle body;
a support structure connected to the vehicle body and configured to provide a framework for one or more thermal components of the vehicle;
a reinforcement member connected to the vehicle body and configured to absorb impact forces; and
an active grille shutter connected to the support structure, the active grille shutter including a pedestrian guard configured for contact with a pedestrian's leg to protect the pedestrian's leg during an impact, wherein the pedestrian guard extends axially forward of the reinforcement member along a length of the vehicle, wherein the active grille shutter and the pedestrian guard are formed unitarily from a single piece of material.

10. The vehicle of claim 9, wherein the active grille shutter includes a main body movably supporting at least one shutter to thereby vary airflow into the vehicle, the main body and the pedestrian guard being unitarily formed from a single piece of rigid material.

11. The vehicle of claim 9, further including a front end fascia positioned axially forward of: the vehicle body; the support structure; the reinforcement member; and the active grille shutter along a length of the vehicle.

12. The vehicle of claim 11, wherein the pedestrian guard includes a front end positioned within a pocket defined by a lower end of the front end fascia.

13. A method of assembling a vehicle, the method comprising:
connecting a support structure to a body of the vehicle such that the support structure provides a framework for one or more thermal components of the vehicle;
connecting a reinforcement member to the body of the vehicle such that the reinforcement member is positioned to absorb impact forces; and
connecting an active grille shutter to the support structure such that a pedestrian guard formed integrally with the active grille shutter extends axially forward of the reinforcement member along a length of the vehicle, wherein the active grille shutter and the pedestrian guard are formed unitarily from a single piece of material.

14. The method of claim 13, wherein connecting the active grille shutter to the support structure includes positioning the active grille shutter vertically below the reinforcement member.

15. The method of claim 13, further comprising connecting a front end fascia to the vehicle such that the front end fascia is positioned axially forward of: the body; the support structure; the reinforcement member; and the active grille shutter along the length of the vehicle.

16. The method of claim 15, wherein connecting the front end fascia to the vehicle includes concealing the pedestrian guard within the front end fascia.

17. The method of claim 16, wherein concealing the pedestrian guard within the front end fascia includes positioning a front end of the pedestrian guard within a pocket defined by a lower end of the front end fascia.

* * * * *